(12) United States Patent
Joshi et al.

(10) Patent No.: US 8,502,728 B2
(45) Date of Patent: Aug. 6, 2013

(54) METHOD AND SYSTEM FOR TRACKING OBJECTS USING RADIO TOMOGRAPHIC IMAGING

(75) Inventors: Sarang Joshi, Salt Lake City, UT (US); Anthony Joseph Wilson, Salt Lake City, UT (US); Neal Patwari, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 123 days.

(21) Appl. No.: 13/063,646

(22) PCT Filed: Sep. 11, 2009

(86) PCT No.: PCT/US2009/056751
§ 371 (c)(1),
(2), (4) Date: Jun. 6, 2011

(87) PCT Pub. No.: WO2010/030956
PCT Pub. Date: Mar. 18, 2010

(65) Prior Publication Data
US 2011/0273321 A1    Nov. 10, 2011

Related U.S. Application Data

(60) Provisional application No. 61/096,662, filed on Sep. 12, 2008.

(51) Int. Cl.
*G01S 13/89* (2006.01)
(52) U.S. Cl.
USPC .............. 342/27; 342/59; 342/179; 342/191

(58) Field of Classification Search
USPC .......................... 342/21, 22, 27, 59, 179, 191
See application file for complete search history.

(56) References Cited

U.S. PATENT DOCUMENTS

| | | | |
|---|---|---|---|
| 5,604,806 A | 2/1997 | Hassan | |
| 6,301,324 B1 * | 10/2001 | Pearson et al. | 378/15 |
| 6,553,120 B1 | 4/2003 | Vaudenay | |
| 6,744,253 B2 * | 6/2004 | Stolarczyk | 324/334 |
| 7,064,660 B2 * | 6/2006 | Perkins et al. | 340/539.13 |
| 7,075,424 B1 | 7/2006 | Sundaresan | |
| 7,307,575 B2 | 12/2007 | Zemany | |
| 7,317,419 B2 | 1/2008 | Sugar | |
| 7,570,063 B2 * | 8/2009 | Van Veen et al. | 324/637 |
| 7,890,060 B2 | 2/2011 | Lehtinen | |
| 8,280,046 B2 | 10/2012 | Rudolf | |
| 2002/0168943 A1 | 11/2002 | Callaway | |
| 2003/0117985 A1 | 6/2003 | Fujii | |
| 2003/0214410 A1 * | 11/2003 | Johnson et al. | 340/573.4 |
| 2004/0170280 A1 | 9/2004 | Fekri | |

(Continued)

FOREIGN PATENT DOCUMENTS

| | | |
|---|---|---|
| WO | WO2009033001 | 3/2009 |
| WO | WO 2010030956 A2 * | 3/2010 |

OTHER PUBLICATIONS

International Search Report for PCT/US2009/056751, mailed Apr. 15, 2010.
Written Opinion for PCT/US2009/056751, mailed Apr. 15, 2010.

(Continued)

*Primary Examiner* — John B Sotomayor
(74) *Attorney, Agent, or Firm* — Workman Nydegger

(57) ABSTRACT

New systems and methodologies that use radio tomography for object tracking.

16 Claims, 9 Drawing Sheets

U.S. PATENT DOCUMENTS

| | | |
|---|---|---|
| 2005/0195109 A1 | 9/2005 | Davi |
| 2005/0258988 A1 | 11/2005 | Jiang |
| 2005/0285792 A1 | 12/2005 | Sugar |
| 2006/0193284 A1 | 8/2006 | Stieglitz |
| 2007/0026935 A1 | 2/2007 | Wolf |
| 2007/0035437 A1* | 2/2007 | Steinway et al. ............... 342/22 |
| 2007/0036353 A1 | 2/2007 | Reznik |
| 2007/0060098 A1 | 3/2007 | McCoy |
| 2007/0086489 A1 | 4/2007 | Carlson |
| 2007/0165845 A1 | 7/2007 | Ye |
| 2007/0177729 A1 | 8/2007 | Reznik |
| 2008/0090572 A1 | 4/2008 | Cha |
| 2008/0123851 A1 | 5/2008 | Guccione |
| 2008/0169961 A1* | 7/2008 | Steinway et al. ............... 342/27 |
| 2008/0244094 A1 | 10/2008 | Rich |
| 2009/0040952 A1 | 2/2009 | Cover |
| 2009/0052663 A1 | 2/2009 | Hammond |
| 2009/0141900 A1 | 6/2009 | Ye |
| 2009/0161127 A1 | 6/2009 | Schweid |
| 2010/0067701 A1 | 3/2010 | Patwari |
| 2010/0207732 A1 | 8/2010 | Patwari |
| 2011/0222421 A1 | 9/2011 | Jana |
| 2011/0273321 A1* | 11/2011 | Joshi et al. ...................... 342/27 |
| 2011/0280397 A1 | 11/2011 | Patwari |
| 2012/0009882 A1 | 1/2012 | Patwari |
| 2013/0003077 A1* | 1/2013 | Suehira et al. ................. 356/479 |

OTHER PUBLICATIONS

International Search Report for PCT/US2009/056718, mailed Aug. 26, 2010.
Written Opinion of the International Searching Authority for PCT/US2009/056718, mailed Aug. 26, 2010.
Zang Li, Wenyuan Xu, Rob miller, Wade Trappe, Securing Wireless Systems via Lower Layer Enforcements, Sep. 29, 2006, pp. 33-41.
Mathur, et al. "Radio-telepathy: Extracting a Secret Key from an Unauthenticated Wireless Channel" MboiCom, Sep. 14, 2008 ACM, pp. 128-139.
Tadayoshi, Kohno et al., "Remote Physical Device Fingerprinting" *IEEE*, Apr. 2005, pp. 93-108.
Liran, Ma et al, "A Hybride Rogue Access Point Protection Framework . . ." *IEEE*, Apr. 2008, pp. 1894-1902.
International Search Report for PCT/US2009/056743, mailed Apr. 26, 2010.
Written Opinion for PCT/US2009/056743, mailed Apr. 26, 2010.
International Search Report for PCT/US2008/075369, mailed Apr. 8, 2009.
Written Opinion for PCT/US2008/075369, mailed Apr. 8, 2009.

* cited by examiner

METHOD AND SYSTEM FOR TRACKING OBJECTS USING RADIO TOMOGRAPHIC IMAGING

CROSS REFERENCE TO RELATED APPLICATIONS

This present application is filed under and pursuant to 35 U.S.C. 371 and claims the priority and benefit of PCT/US2009/056751 filed Sep. 11, 2009, which in turn claims priority to and the benefit of U.S. Provisional Application No. 61/096,662, entitled "Method and System for Tracking Objects Using Radio Tomographic Imaging," filed on Sep. 12, 2008, each being herein incorporated by reference in its entirety for all purposes.

NOTICE OF FEDERAL FUNDING

This invention was made with government support under 0748206 awarded by National Science Foundation. The Government has certain rights to this invention.

BACKGROUND OF THE INVENTION

1. Field of Invention

The present invention relates to the field of tomography. Specifically, the present invention relates to object tracking using radio tomography techniques.

2. The Relevant Technology

There is a demand for object tracking.

SUMMARY OF THE INVENTION

What is described in the present invention is a method for identifying and tracking objects using radio tomography.

Unlike current models for radio channel shadowing indications, real-world shadowing losses on different links in a network are not independent. The correlations have both detrimental and beneficial impacts on sensor, ad hoc, and mesh networks. First, the probability of network connectivity reduces when link shadowing correlations are considered. Next, the variance bounds for sensor self-localization change, and provide the insight that algorithms must infer localization information from link correlations in order to avoid significant degradation from correlated shadowing. Finally, a major benefit is that shadowing correlations between links enable the tomographic imaging of an environment from pairwise RSS measurements. Embodiments of the present invention apply measurement-based models, and measurements themselves, to analyze and to verify both the benefits and drawbacks of correlated link shadowing.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Figure 1:
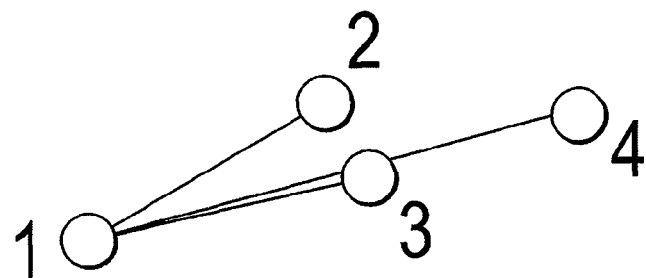
FIG. 1 is an illustration of three links between nodes in a network, in accordance with one embodiment of the present invention.

Reference will now be made in detail to the preferred embodiments of the present invention, methods and systems for object identification and tracking using radio tomography. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Overview

Embodiments of the present invention address the effects of an accurate radio layer model on multi-hop wireless network performance analysis. In particular, a path loss model is applied which connects link shadowing losses to the physical environment in which the network operates. Because nearby links are often affected by the same shadowers in the environment, link losses can be correlated. The new probability model for path loss improves the accuracy of analysis of the effects of the physical layer in multi-hop networks. The effects of correlated shadowing is quantified in three topics: network connectivity, sensor received signal-strength (RSS)-based localization bounds, and radio tomographic imaging (RTI). These quantifications use simulation and analysis using a proposed link shadowing model, and experimental measurements.

Each section introduces its topic in more detail, but in short, existing i.i.d. link fading models overestimate network connectivity and do not permit complete analysis of RSS self-localization lower bounds on variance. Further, the same effect which causes correlated shadowing also enables the imaging of environments using link measurements of RSS, which may lead to the development of whole-building imaging sensor networks for security applications or for emergency use by fire-fighters and police.

Path Loss and Fading

The path loss on a link has three contributions: Large-scale path loss due to distance; shadowing loss due to obstructions; and (3) non-shadowing loss due to multipath (e.g., small-scale or frequency selective fading). Given this delineation, we denote $P_{i,j}$ as the measured received power at node j transmitted by node i, in Eqns. 1 and 2.

$$P_{i,j} = \overline{P}(d_{i,j}) - Z_{i,j}, \text{ and} \tag{1}$$

$$Z_{i,j} = X_{i,j} + Y_{i,j} \tag{2}$$

In Eqns. 1 and 2, $d_{i,j}$ is the distance between nodes i and j, $\overline{P}(d)$ is the is the ensemble mean dBm received power at distance d, $X_{i,j}$ is the dB shadowing loss, and $Y_{i,j}$ is the non-shadow fading loss in dB. We refer to $Z_{i,j}$ as the total fading loss. Ensemble mean received power at distance d is given by Eqn. 3.

$$\overline{P}(d) = P_T - \Pi_0 - 10n_p \log_{10} \frac{d}{\Delta_0} \tag{3}$$

In Eqn. 3, $P_T$ is the transmitted power in dBm, $n_p$ is the path loss exponent, and $\Pi_0$ is the loss experienced at a short reference distance $\Delta_0$ from the transmitter antenna.

Two fading models can be considered. The first is that fading is insignificant, i.e., $Z_{i,j}$ for all links (i,j). This is commonly referred to as the circular coverage model, because links in all directions will be disconnected deterministically for d such that $\overline{P}(d)$ exceeds a threshold.

The second model is that fading $Z_{i,j}$ is random, independent and identically distributed on each link. This can be referred to as the i.i.d. link fading model. In reality, neither model accurately represents the radio channel for multi-hop networks. While coverage area is certainly not circular, it generally has some continuous shape. The i.i.d. link fading model does not have any spatial memory, so there is no sense of coverage area. For example, consider nodes which can communicate with node 1 in FIG. 3, which is an illustration of three links with a common node. Node 2 may be disconnected while node 3 is connected, or vice versa, regardless of how close nodes 2 and 3 are to each other.

Also, the fading on links (1,3) and (1,4) are independent, even though objects which attenuate link (1,3) probably also attenuate link (1,4). These disconnects between the i.i.d. link fading model and reality motivate the application of a model with link shadowing correlation.

Network Shadowing Model

In order to develop analysis and simulations which consider correlated link shadowing, a statistical model is applied which has been verified using measurements. In mobile radio networks, it is possible to apply a network shadowing model (NeSh). To model the experimentally observed characteristic of correlated link shadowing, the network shadowing (NeSh) model first models the environment in which the network operates. It then considers shadowing losses to be a function of that environment, which has the effect of correlating losses on geographically proximate links.

The shadowing caused by an environment is quantified in an underlying spatial loss field p(x). The NeSh model assumes that p(x) is an isotropic wide-sense stationary Gaussian random field with zero mean and exponentially decaying spatial correlation, to arrive at Eqn. 4.

$$E[p(x_i)p(x_j)] = R_p(d_{i,j}) = \frac{\sigma_X^2}{\delta} e^{-\frac{d_{i,j}}{\delta}} \tag{4}$$

In Eqn. 4, $d_{i,j} = \|x_j - x_i\|$ is the Euclidian distance between $x_i$ and $x_j$, $\delta$ is a space constant and $\sigma_x^2$ is the variance of $X_{i,j}$.

The shadowing caused by an environment is quantified in an underlying spatial loss field p(x). The NeSh model assumes that p(x) is an isotropic wide-sense stationary Gaussian random field with zero mean and exponentially decaying spatial correlation, to arrive at Eqn. 4.

Next, the NeSh model formulates the shadowing on link a=(i,j) as a normalized integral of the p(x) over the line between link endpoints $x_i$ and $x_j$, in Eqn. 5.

$$X_a \triangleq \frac{1}{d_{i,j}^{1/2}} \int_{x_i}^{x_j} p(y) dy \tag{5}$$

For exhibiting single link properties, the NeSh model agrees with two important empirically-observed link shadowing properties. The first property indicates that the variance of link shadowing is approximately constant with path length. The second property indicates that shadowing losses are Gaussian.

The model in Eqn. 5 can be seen to exhibits the characteristics of the second property, since $X_a$ is a scaled integral of a Gaussian random process. To show the first property, it is noted that $E[X_a] = 0$, resulting in Eqn. 6.

$$\text{Var}[X_a] = \frac{1}{d_{i,j}} \int_{x_i}^{x_j} \int_{x_i}^{x_j} R_p(\|\beta - \alpha\|) d\alpha^T d\beta \tag{6}$$

Using Eqn. 4 as a model for spatial covariance results in Eqn. 7.

$$\text{Var}[X_a] = \sigma_X^2 \left[ 1 - \frac{\delta}{d_{i,j}} \left( 1 - e^{-d_{i,j}/\delta} \right) \right] \tag{7}$$

Also, when $d_{i,j} \gg \delta$, the NeSh model exhibits the first property, as provided in Eqn. 8.

$$\text{Var}[X_a] \approx \sigma_x^2 \tag{8}$$

Joint link properties are also noted. Given two links a, b $\in \mathbb{Z}^2$, both $X_a$ and $X_b$ are functions of the same shadowing field p(x), thus the model in Eqn. 5 introduces correlation between them. The covariance between $X_a$ and $X_b$ is provided in Eqn. 9, and is computed by numerical integration.

$$\text{Cov}(X_a, X_b) = \frac{\sigma_X^2/\delta}{d_{i,j}^{1/2} d_{l,m}^{1/2}} \int_{x_i}^{x_j} \int_{x_l}^{x_m} e^{-\frac{\|\beta - \alpha\|}{\delta}} d\alpha^T d\beta \tag{9}$$

Non-shadow fading properties are also noted. The received power $P_{i,j}$ consists of losses due both to shadow fading $X_{i,j}$ and non-shadow fading $Y_{i,j}$. The NeSh model assumes that $\{Y_{i,j}\}_{i,j}$ are independent. Nodes in ad hoc, sensor, and mesh networks are typically separated by many wavelengths, and small-scale fading correlation is approximately zero at such distances. Further, the NeSh model assumes that small scale fading is independent of shadow fading.

In particular, $Y_{i,j}$ is modeled as Gaussian (in dB) with zero mean and variance $\sigma_Y^2$. The NeSh model assumes that nodes have a wideband receiver which effectively averages narrow-band fading losses across frequencies in its bandwidth. As an average of small-scale fading losses at many frequencies, $Y_{i,j}$, by a central limit argument, is approximately Gaussian.

A joint link received power model is described. On a single link $a=(i,j)$, total fading loss $Z_a = X_a + Y_a$. Since $X_a$ and $Y_a$ are independent and Gaussian (in dB), total fading $Z_a$ is also Gaussian with variance, as shown in Eqn. 10.

$$\sigma_{dB}^2 \triangleq \text{Var}[Z_a] \approx \sigma_X^2 + \sigma_Y^2 \quad (10)$$

Furthermore, a joint model is considered for the total fading on all links in the network. Let $a_1, \ldots, a_K$ for $a_k = (i_k, j_k)$ be an enumeration of the K unique measured links in the network. A unique link $a_k$ must have both that $a_k \neq a_l$ for all $l \neq k$ and that the reciprocal link is not included, i.e., $(j_k, i_k) \neq a_l$ for all l. The vector RSS on all links is given in Eqn. 11.

$$P = [P_{a_1}, \ldots, P_{a_K}] \quad (11)$$

The vector P is a is multivariate Gaussian, and thus it is completely specified by its mean and covariance. A vector $\overline{P}$ is defined as the mean of P, which is expressed in Eqn. 12.

$$\overline{P} = [\overline{P}(d_{a_1}), \ldots, \overline{P}(d_{a_K})] \quad (12)$$

In Eqn. 12, $\overline{P}(d_{a_k}) = \overline{P}(d_{i_k, j_k})$ is expressed in Eqn. 3. Denoting C to be the covariance matrix of P, results in Eqn. 13, where $I_{k,l} = 1$ if $k=l$ and 0 otherwise, and the covariance $\text{Cov}(X_a, X_b)$ is given in Eqn. 9.

$$C_{k,l} = \sigma_Y^2 I_{k,l} + \text{Cov}(X_{a_k}, X_{a_l}) \quad (13)$$

Network Connectivity

It is typically of critical importance to ensure that a multi-hop wireless network is connected. A network can be represented as a $\mathcal{G} = (\mathcal{V}, \mathcal{E})$ with vertices $\mathcal{V}$ as the set of all nodes, and a set of directional edges $\mathcal{E}$ containing each transmitter/receiver pair which can communicate. A network is connected if there exists a path between each pair of vertices in its graph. If a network is not connected, it may fail to perform as intended, lacking the capability to transfer data from one part of a network to another. If nodes are mobile, a temporary disconnectivity introduces latency until reconnection. If nodes are stationary, for example in a sensor network, a non-connected network requires a human administrator to go back to repair the sensor network, possibly by moving existing nodes or deploying additional nodes. Since non-connectivity is a major failure, networks are ideally over-provisioned or deployed densely in order to ensure a high probability of connectivity.

One assumption made is that the ability of a link to communicate is a binary quantization of received power. That is, if $P_{i,j} \geq P_{thr}$ for some threshold power $P_{thr}$, then transmitter i can communicate with receiver j, and otherwise they cannot communicate. This assumption provides a definition for the common idea of 'range'. Range, $R_{thr}$ is defined as the distance at which the mean received power in Eqn. 3 is equal to the threshold power, and is defined in Eqn. 14.

$$R_{thr} = \Delta_0 10^{-(P_{thr} - P_T + \Pi_0)/(10 n_P)} \quad (14)$$

As $R_{thr}$ increases (or equivalently as $P_T$ is increased), the connectivity of the network increases.

Here, it is assumed that transmit powers and threshold powers are identical for each node. In reality, device variations and differing battery levels result in many single-directional edges. Although these results consider only bi-directional edges, the case of single-directional links can be addressed by specifying a random $P_T$ and $P_{thr}$ for each device.

Simulation is used to generate random graphs which represent random deployments of a multi-hop network. Each deployment has the identical node geometry; because each deployment is in a different place, the radio environment and thus the received power vector P is different. In the simulation, nodes include $\mathcal{V} = \{1, \ldots, N\}$, particular coordinates $(x_i, y_i)$ for all $i \in \mathcal{V}$, and then independent trials are performed. In each trial, the following conditions are satisfied. First, vector P is generated from a multivariate Gaussian distribution, with mean $\overline{P}$ determined from Eqn., 12 and covariance determined from Eqn. 13. Also, the set of edges is defined as $\mathcal{E} = \{a : P_a \geq P_{thr}\}$. In addition, it is determined whether or not the graph $\mathcal{G}$ is connected.

For simulations, model parameters are set as follows: $\sigma\{dB\} = 7.0$, $n_p = 3.0$, and $\Delta_0 = 1$ m; and the measured parameters of $\delta = 0.21$ m and $\sigma_X/\sigma_{dB} = 0.29$. $R_{thr}$ is varied, or equivalently of Eqn. 14, ($P_T - \Pi - P_{thr}$) is varied. This allows for the study of the effects of increasing 'range', however that increased range is achieved.

Figure 2:
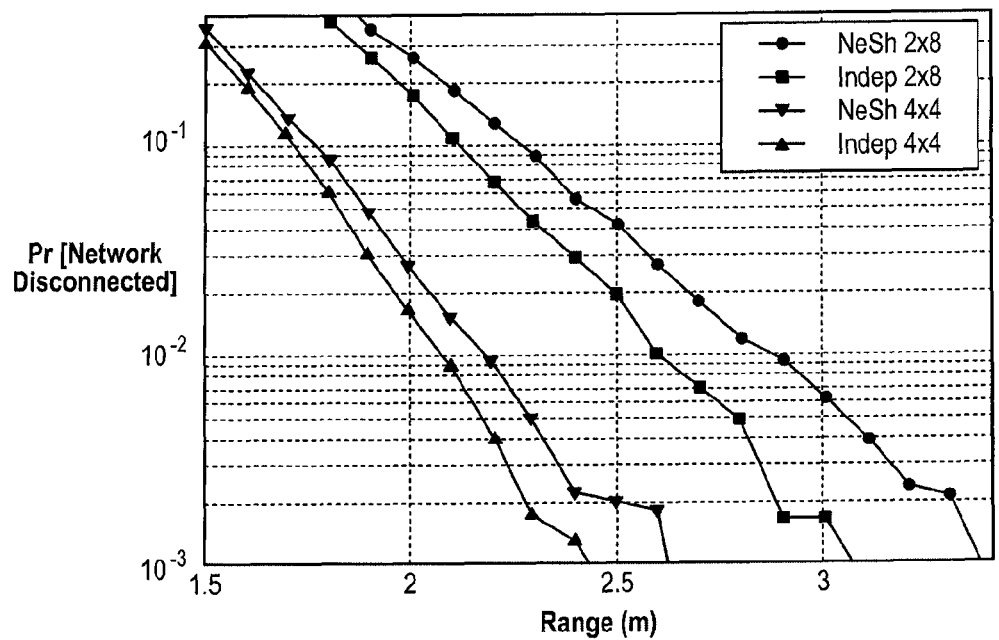
FIG. 2 is an illustration of the probability that a 4×4 grid and 8×2 grid networks are not connected vs. $R_{thr}$, when using correlated and independent link shadowing models, in accordance with one embodiment of the present invention.

A sensor network of N=16 nodes deployed regularly in a 4 by 4 grid, in a 4 m by 4 m area (so that the nodes are spaced each 1.333 m). $10^5$ trials are run at each value of $R_{thr}$ between 1.1 m and 2.5 m. FIG. 2 shows the simulated probability of the network being disconnected, in both i.i.d. link fading and correlated link fading models.

The same N=16 nodes are also deployed in a long rectangle, in a 2 by 8 grid, in a 1.5 m by 10.5 m area (so that nodes are spaced each 1.5 m). This deployment has approximately the same area (16 m² vs. 15.75 m² here) and thus the same node density. The longer deployment simulates a sensor network used, for example, in a security system to monitor a border. $10^5$ trials are run at each value of range $R_{thr}$ between 1.8 m and 3.4 m, and FIG. 2 displays the probabilities of non-connectivity in both fading models.

For reliable deployments, e.g., with $R_{thr} = 2.2$ m in the square example, the probability of the network being disconnected is $4.1 \times 10^{-3}$ under the i.i.d. link fading model and $9.5 \times 10^{-3}$ under the correlated link shadowing model. The increase of 230% for the correlated model represents a significant increase in the risk of network non-connectivity. In the rectangular example, for $R_{thr} = 3.0$ m, the probability of non-connectivity rises 380% from $1.6 \times 10^{-3}$ under the i.i.d. link fading model to $6.1 \times 10^{-3}$ under the correlated link shadowing model. As such, narrow deployment areas magnify the negative effects of link correlation on network connectivity. The results also indicate that as the overall reliability is increased, the over-estimation of connectivity in the link fading model will be increasingly severe.

Sensor Self-Localization

The present invention presents the Cramer-Rao bound (CRB) for localization variance when measurements of signal strength are correlated as given by the NeSh model. The CRB is a lower bound on the variance of any unbiased estimator.

Derivation of the CRB is discussed. To derive the Cramer-Rao bound, coordinates to be estimated, $\theta$, are unknown, and given in Eqn. 15.

$$\theta = [x_1, \ldots, x_n, y_1, \ldots, y_n]^T \quad (15)$$

In Eqn. 15, $x_i=[x_i,y_i]^T$ is the coordinate of node i. Here, it is assumed that some devices, nodes n+1, . . . , N have a priori known coordinate, and thus do not need to be estimated.

Let $\hat{x}_i$ and $\hat{y}_i$ be unbiased estimators of $x_i$ and $y_i$. The CRB provides that the trace of the covariance of the $i^{th}$ location estimate, which is defined as the location estimation variance bound, satisfies Eqn. 16.

$$\sigma_i^2 \triangleq tr\{cov_\theta(\hat{x}_i, \hat{y}_i)\} = \text{Var}_\theta[\hat{x}_i] + \text{Var}_\theta[\hat{y}_i] \geq [F^{-1}]_{i,i} + [F^{-1}]_{n+i,n+i} \quad (16)$$

The Fisher information matrix F is defined in Eqn. 17.

$$F = F_\mu = F_C \quad (17)$$

$$[F\mu]_{m,n} = \left[\frac{\partial \overline{P}}{\partial \theta_m}\right]^T C^{-1} \left[\frac{\partial \overline{P}}{\partial \theta_n}\right]$$

$$[F_C]_{m,n} = \frac{1}{2} tr\left[C^{-1} \frac{\partial C}{\partial \theta_m} C^{-1} \frac{\partial C}{\partial \theta_n}\right]$$

The derivatives $$\frac{\partial \overline{P}}{\partial \theta_i}$$

depend on whether the ith parameter is an x or y coordinate of a node, and are given in Eqn. 18.

$$\frac{\partial \overline{P}(d_{a_k})}{\partial x_m} = \begin{cases} -\alpha(x_m - x_{j_k})/d_{m,j_k}^2, & \text{if } m = i_k \\ -\alpha(x_m - x_{i_k})/d_{m,i_k}^2, & \text{if } m = j_k \\ 0, & \text{otherwise} \end{cases} \quad (18)$$

$$\frac{\partial \overline{P}(d_{a_k})}{\partial y_m} = \begin{cases} -\alpha(y_m - y_{j_k})/d_{m,j_k}^2, & \text{if } m = i_k \\ -\alpha(y_m - y_{i_k})/d_{m,i_k}^2, & \text{if } m = j_k \\ 0, & \text{otherwies} \end{cases}$$

In Eqns. 18, $$\alpha = \frac{10 n_p}{\log 10}$$

and distance $d_{m,i_k}^2 = \|x_m - x_{j_k}\|^2$.

The term $F_\mu$ is the mean term and $F_C$ is defined as the covariance term of the Fisher information matrix. As the names imply, the mean and covariance terms quantify the information present in the mean and the covariance of the RSS measurements in the network, respectively.

RSS measurements are informative in the mean because the ensemble average RSS measurement is a function of distance. In CRB analysis under the i.i.d. link fading model, $C=\sigma_{dB}^2 I$ for identity matrix I. Under the NeSh model, the information in the mean term is reduced by the non-diagonal covariance matrix C.

In contrast, the covariance term provides additional information about the coordinates due to the correlations found in the link RSS measurements. In effect, relationships between fading loss measurements on pairs of links in the network will indicate something about the relative geometry of those links. For example, if two links (i,j) and (i,k) both have very high losses $Z_{i,j}$ and $Z_{i,k}$, it may indicate that nodes j and k are in the same relative direction from node i. When using the i.i.d. link fading model, $F_C=0$, and thus no information is gained from the relationships between measurements on pairs of links.

The calculation of $$\left\{\frac{\partial C}{\partial \theta_k}\right\}_k$$

is complicated by the size of matrix C and the fact that $2^n$ different partial derivatives are required. The term $$\frac{\partial C}{\partial \theta_k}$$

is calculated using a finite difference approximation. Writing the covariance matrix as $C(\theta)$ to explicitly show it as a function of the coordinates $\theta$, as shown in Eqn. 19.

$$\frac{\partial C}{\partial \theta_k} \approx \frac{C(\theta + \epsilon e_k) - C(\theta)}{\epsilon} \quad (19)$$

In Eqn. 19, $e_k$ is the vector of all zeros except for a 1 in the kth position, and $\epsilon$ is a small positive constant, in this case, $\epsilon=10^{-2}$ m.

CRB comparisons can be made in example networks. To evaluate the relative effect of correlation in the path loss model, the relative increase in the standard deviation bound compared to the i.i.d. link fading model is defined in Eqn. 20.

$$\alpha_i = \frac{\sigma_i - \tilde{\sigma}_i}{\tilde{\sigma}_i} \quad (20)$$

In Eqn. 20, $\sigma_i^2$ is the location estimation variance bound from Eqn. 16 for the case of correlated shadowing using C given in Eqn. 13, and let $\tilde{\sigma}_i^2$ denote the variance bound for the case of independent link shadowing (using $C=\sigma_{dB}^2 I$).

Two particular network geometries are selected for calculation of localization bounds, both in a 4 m by 4 m square area. In both cases, the nodes closest to the corners of the square area are chosen to be the known-location nodes. That is, the nodes closest to the corners are numbered N−3, . . . , N, and the remaining n=N−4 nodes have no prior coordinate knowledge.

Figure 3A:
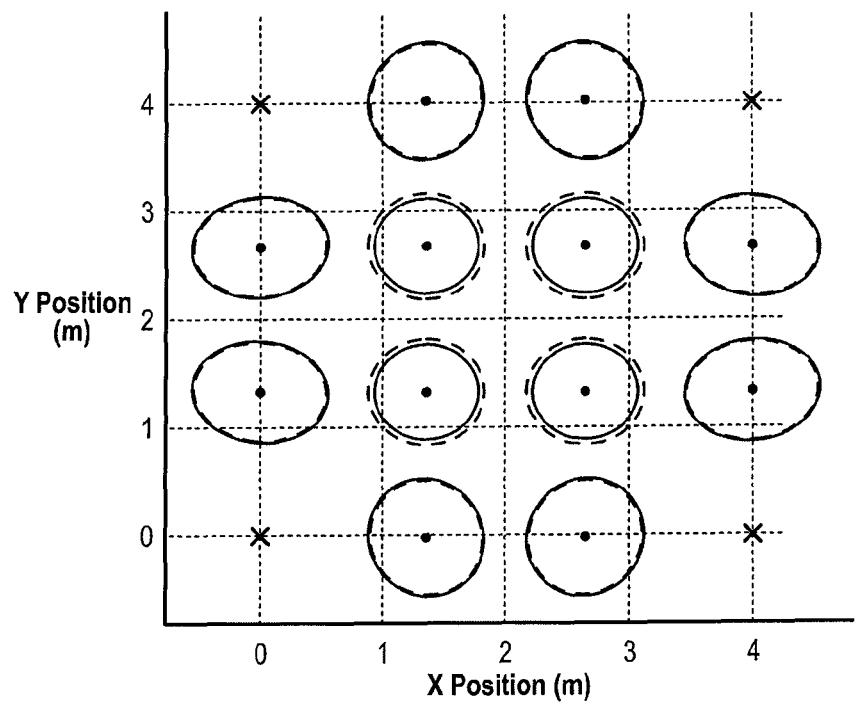
FIGS. 3(a) and 3(b) illustrate the CRB on the one or uncertainty ellipses when shadowing is correlated and independent, for 16 node networks, in (a) grid and (b) random deployments, with actual coordinates of known location nodes (x) and unknown location nodes, in accordance with one embodiment of the present invention.

First, nodes are deployed in a 4 by 4 square grid within the 4 m by 4 m area. Nodes are separated by 1.333 m, where N=16, and n=12. CRB is calculated in both i.i.d. and correlated link fading models. FIG. 3(a) shows the actual location and bound on 1−σ covariance ellipse of each node i=1 . . . 12. The 1−σ covariance ellipse is a useful visual representation of the magnitude and direction of variation of a node's coordinate estimate. The locations of the reference nodes are also shown. For i=1 . . . 12, the values $\alpha_i$ are in the range of −0.09 to 0.02, with an average of −0.024. This means that on average, the standard deviation bound, when shadow fading correlations are taken into account, decreases by 2.4%.

Figure 3B:
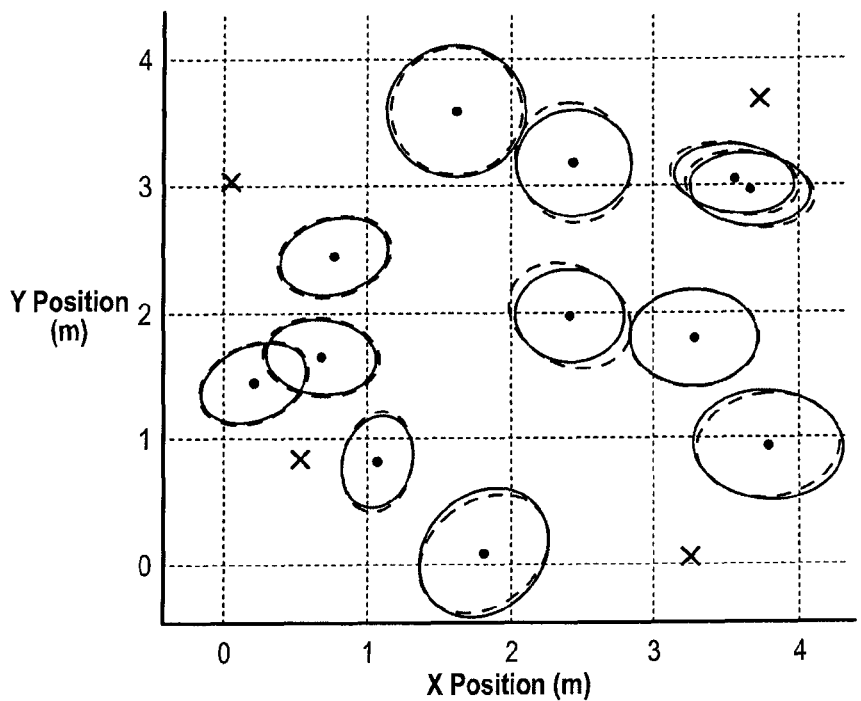

Next, a random deployment is generated by selecting coordinates independently from a uniform distribution on [0 m, 4 m]². The actual node locations and the calculated CRB on 1−σ covariance ellipse for each node are shown in FIG. 3(b).

For i=1 . . . 12, the values $\alpha_i$ are in the range of −0.13 to 0.03, with an average of −0.045. The average standard deviation bound decreases by 4.5%. In general, for random deployments, the decrease in standard deviation bound is more significant than the grid deployment.

These decreases in the bound may be unexpected, because it is counterintuitive that correlation may improve localization. It might be expected that increased link correlation effectively increases the 'noise' level since measurements with additional nodes cannot be used as effectively to 'average-out' fading error. For example, in FIG. 1, if an obstruction attenuates both links (1,3) and (1,4), then both link measurements would tend to push nodes 3 and 4 further from node 1. If link measurements were i.i.d., there would be a lower chance of both link measurements (1,3) and (1,4) 'agreeing' nodes 3 and 4 should be further from node 1.

Ignoring the covariance term $F_C$ and focus solely on the mean term $F_\mu$ in Eqn. 17. This mean term of the Fisher information matrix should provide the correlation acting to increase the effective noise level. So, momentarily setting $F_C$=0 in Eqn. 17, the bound is calculated using $F=F_\mu$. This is defined as the NeSh model-based mean term-only bound.

This NeSh model-based mean term-only bound is calculated for the same deployment geometries studied previously in FIG. 3. In this case, the 1–σ covariance ellipses of the NeSh model-based mean term-only bound and of the i.i.d. link fading CRB in FIG. 4 are compared. The results show clearly that using only the information in the mean term, the lower bound increases when taking into account link correlations. For the grid deployment in FIG. 4(*a*), the values $\alpha_i$ are in the range of 0.03 to 0.11, with an average of 0.080. This means that on average, when the information in the covariance term of the Fisher information is ignored, the lower bound on standard deviation increases by 8.0%. For the random deployment in FIG. 4(*b*), the same lower bound increases an average of 13.8%. In general random deployments show a more significant increase in lower bound when considering the mean term-only.

As such, the intuition that link correlations negatively impact localization is true, when estimators only consider the localization information contained in the mean relationship between received power and distance in Eqn. 3. Also, the use of the information contained in the correlations between links' fading measurements can compensate for the information loss in the mean term, and in fact can reduce localization variances lower than previously thought possible.

These results indicate that estimators which consider correlations between link measurements when estimating node locations will aid the effort to achieve the lowest possible variance.

Radio Tomographic Imaging

The mechanism which causes correlated link shadowing is detrimental to network connectivity and can be detrimental to sensor self-localization, as discussed in the past two sections. However, there is a benefit gained from the existence of correlated link shadowing. Simultaneous imaging through whole buildings would improve security systems and could save lives in emergency situations. For example, if fire-fighters knew where people were within a building, they could more accurately direct rescue operations, and monitor emergency personnel in building.

If link shadowing is a function of the attenuating properties of the environment in between the transmitter and receiver, then link shadowing measurements can be used to infer those properties. Consider the 21-node network shown in FIG. 5. An attenuating object in the building would tend to increase shadowing loss on multiple links which cross over that object. The inverse perspective on this problem is that high shadowing loss on multiple, intersecting links can be used to infer the location of that attenuating object. This is referred to as radio tomographic imaging throughout this Application.

The present imaging method uses transmission, which is different than imaging using radar scattering. These two wave propagation mechanisms have fundamentally different properties. In scattering, a wave hits an object and effectively retransmits waves in other directions. The scattered wave measured at the radar device has power on the order of $1/d^4$ (in free space). In transmission, a wave passes through an object and continues in one direction. The transmitted wave loses power due to transmission but arrives at a distant receiver with power on the order of $1/d^2$ (again, in free space). In cluttered environments, both exponents will increase. One fundamental benefit of transmission is that the signal range is approximately the square of that of scattering.

Note that imaging requires correlated shadowing. If link shadowing is independent between links, then there is no chance of being able to image the location of the obstructions in the environment.

The imaging method proceeds as follows. To compute an image of the motion in the building at time n, three operations are defined and described below. The first operation is difference, where the link path loss difference is found, $v_{i,j}=P_{i,j}^{avg}-P_{i,j}$, where $P_{i,j}^{avg}$ is the past history average received power for link (i,j). Denote v as a vector of all $\{v_{i,j}\}_{i,j}$ as in Eqn. 21, below.

The second operation determines the inverse, by finding the weighted least-squared (WLS) error solution for the (pixilated) attenuation field p. The WLS estimator is given by $\hat{p}=\Pi v$, where $\Pi$ is the projection matrix given in Eqn. 25.

The third operation determines contrast, where the real-valued attenuation estimate $\hat{p}$ is converted into an image vector $\tilde{p}$ with values in the range [0,1] using the transformation in Eqn. 24.

A discussion on the difference operation follows. When motion is imaged, the static attenuation can be calculated initially, assuming that the nodes are deployed and measuring link losses prior to any motion in the environment. Alternatively, if there is quite a bit of motion during the initial setup, an average of path losses measured during a long segment of random motion would reduce the effects of each particular motion is expected. In that case, a system might use a running average of the link losses over a long history to estimate the static attenuation. In any of these cases, $P_{i,j}^{avg}$ is defined as the average past history received power on link (i,j). The loss difference $v_{i,j}=P_{i,j}^{avg}-P_{i,j}$ quantifies the current additional loss on link (i,j). Additional loss on this link should be explained by high additional attenuation in the field p(x). Unique measured links are listed as $a_k=(i_k,j_k)$ for k=1, . . . , K where K is the total number of measured links. Eqn. 21 is defined as follows.

$$v=[v_{i_1 j_1}, \ldots, v_{i_K j_K}]^T \qquad (21)$$

A discussion on the inverse operation follows. Next, the pixilated additional loss field is solved, as defined in Eqn. 22.

$$p=[p(y_1), \ldots, p(y_M)]^T \qquad (22)$$

In Eqn. 22, $y_i$ is the center coordinate of the ith pixel. The vector p is correlated, as given in Eqn. 4.

The imaging model is a linearized and discretized version of the link shadow fading Eqn. 5. Instead of an integral across the attenuation field p(y), the link shadowing is expressed as a linear combination of the values in vector p, plus noise vector n, as shown in Eqn. 23.

$$v=Ap+n \quad (23)$$

Figure 6:
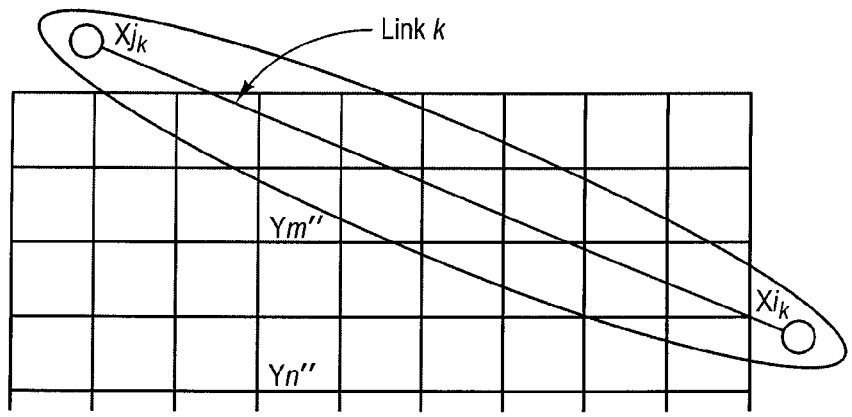
FIG. 6 is an illustration of link shadowing, in accordance with one embodiment of the present invention.

Row k of the transfer matrix A in Eqn. 23 is of a value such that the loss on the link $a_k$ (between nodes $i_k$ and $j_k$) is a weighted sum of the losses in each pixel between the nodes. Since no pixel center will be exactly on the line from $x_{i_k}$ to $x_{j_k}$, the term 'in between' is quantified using a narrow ellipse with foci $x_{i_k}$ and $x_{j_k}$. Any pixel m with center coordinate $y_m$ within this ellipse is included in the sum. This is depicted in FIG. 6. As such, the condition in Eqn. 24 exists.

$$A_{k,m} = \frac{1}{d_{a_k}^{1/2}} \cdot \begin{cases} 1, & \|x_{i_k} - y_m\| + \|x_{j_k} - y_m\| \le d_{a_k} + \lambda \\ & \text{and } d_{a_k} > d_{min} \\ 0, & \text{otherwise} \end{cases} \quad (24)$$

In Eqn. 24, $d_{a_k} = d_{i_k j_k} = \|x_{i_k} - x_{j_k}\|$, where $\lambda$ is the parameter which determines the ellipse width, and $d_{min}$ is a minimum link distance. The normalization by $d_{a_k}^{1/2}$ in Eqn. 24 parallels the normalization term in the model of Eqn. 5.

The term $d_{min}$ is set much less than the dimension of the sensed area. Very short link distances, $d_{a_k} < d_{min}$, tend to be on links which do not impinge on the area to be imaged (since sensors are outside of the area). This limitation avoids considering these uninformative link measurements.

Since pixels are correlated, it is critical to use that correlation in the image estimator. Thus, the regularized weighted least-squared error (WLS) estimator is used, where the conditions in Eqn. 25 exist.

$$\hat{p} = \Pi v$$
$$\Pi = RA^T(ARA^T + \sigma_K^2 I_K)^{-1} \quad (25)$$

In Eqn. 25, the term $\sigma_K^2$ is a regularization constant, $I_K$ is the K×K identity matrix, R is the correlation matrix with (i,j)th element $R_{i,j} = R_p(\|y_i - y_j\|)$ given in Eqn. 4, and A is the transfer matrix from Eqn. 23. The regularization term $\sigma_K^2 I_K$ makes the estimator robust to any rank-deficiency in transfer matrix A. Rank-deficiency should be expected, both because there can be more pixels than link measurements, and even if not, it is not ensured that each pixel's attenuation can be uniquely determined.

Note that computational complexity is small enough to be implemented in real time. The projection matrix Π is calculated only once. The 'inverse' step requires only the multiplication of Π and vector v.

A discussion on the contrast operation follows. In the final step, the real-valued pixels $\hat{p}$ are adjusted to an intensity in [0,1] in a way that will be meaningful to a user. Rather than simply linearly scale the values of $\hat{p}$ to fit within [0,1], it is shown to the user which pixels show statistically significant attenuation. This is accomplished by setting a threshold value of attenuation which has a low probability of being measured in static conditions. Those pixels are displayed higher than the threshold attenuation value to a intensity value above 0.5, and those pixels below the threshold to an intensity below 0.5.

Specifically, a threshold is defined as $c\sigma_p$, where $\sigma_p$ is the standard deviation of all values of $\hat{p}$ in the startup history, and c is a positive constant. Since link losses v are zero-mean multivariate Gaussian (in dB) and $\hat{p}$ is a linear combination of v, pixel values $\hat{p}$ will also be zero-mean and Gaussian. Thus, the false alarm probability, i.e., that $\hat{p}$ $(y_i) > c\sigma_p$ when the environment is static, is approximately Q(c), where (•) is the complementary CDF of a standard normal random variable, $$Q(x) = \frac{1}{2}[1 - \text{erf}(x/\sqrt{2})].$$

For example, in the experiment described in below, when c=2.8, this makes the false alarm probability approximately 0.25%.

In addition, pixel values are scaled so that an intensity of 1 indicates the highest pixel value. This is done by using the following (nonlinear) scaling function, in Eqn. 26.

$$\tilde{p} = 1 - Q\left(\frac{\hat{p} - c\sigma_p}{a}\right) \quad (26)$$

In Eqn. 26, a scaling constant a is based on the maximum value $\hat{p}$, of which is denoted as $p_{max} = \max \hat{p}$, in Eqn. 27.

$$a = \max[\epsilon_a, (p_{max} - c\sigma_p)/b] \quad (27)$$

In Eqn. 27, $\epsilon_a$ and b are predetermined positive constants. In Eqn. 27, a>0 so that Eqn. 26 does not have a divide-by-zero condition, and thus Eqn. 27 assigns it a minimum of $\epsilon_a$. The result of Eqn. 27 is to ensure that when some pixels have $p(y_i) > c\sigma_p$, that the maximum attenuation in the image is always displayed with intensity of Q(b). For example, for b=5 in the following example, this dictates that the maximum intensity is very close to 1.

Figure 7A:
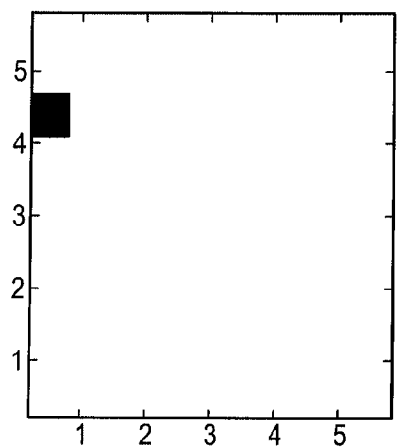
FIGS. 7(a)-(f) are illustrations of radio tomographic images for times of a person in a room, in accordance with one embodiment of the present invention.
Figure 7B:
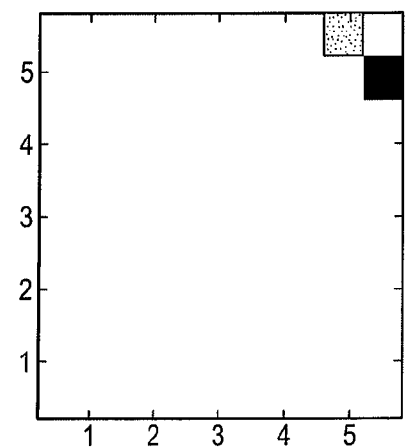
Figure 7C:
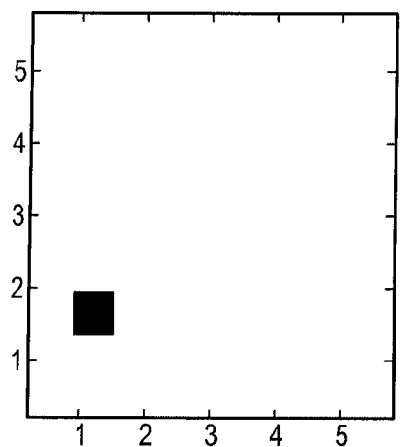
Figure 7D:
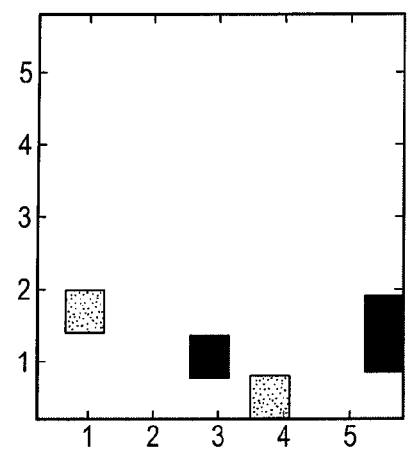
Figure 7E:
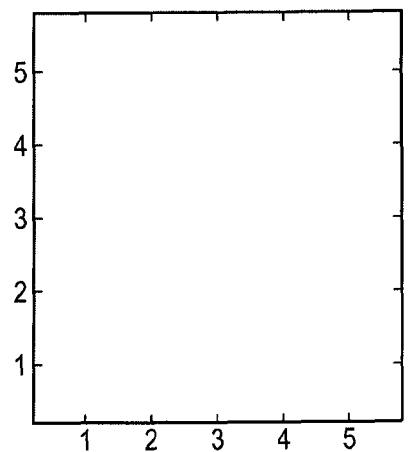
Figure 7F:
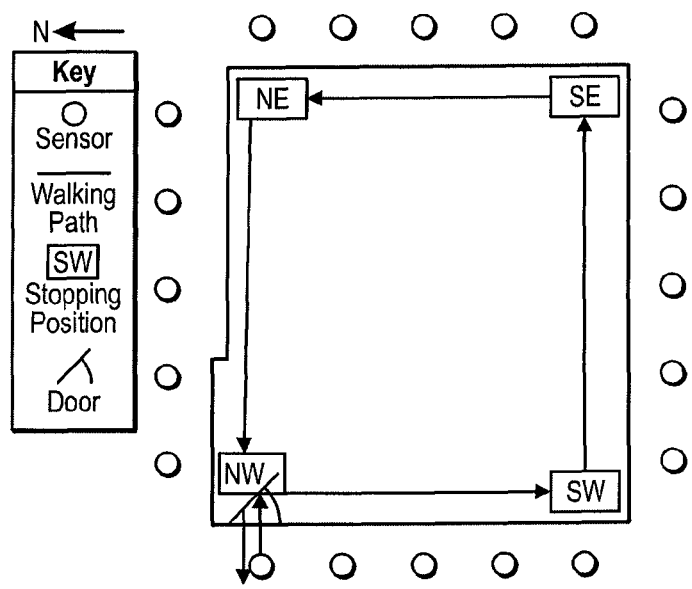

In one implementation, an unoccupied 5 m by 5 m room is used. All walls are interior walls, and sensors are placed outside of the room, about 0.5 m from each wall, as shown in FIG. 7(f).

Each sensor records the RSS and identification (id) number from any messages received from its neighbors. It also transmits (at 915 MHz), each half second, a message containing its id and the (id, RSS) measurement pairs which it recorded in the past half second. A laptop connected to a listening node records and time-stamps all packets transmitted by the sensors. The laptop is also connected to a video camera which records time-stamped images from within the room so that the nature of activity is known at each second.

To reduce missing data (due to interference), the two measurements are averaged over time on a link (i,j). Thus, for each second there is one measurement for the bi-directional link between nodes i and j, $P_{i,j}$. If there were no measurements to average, then $P_{i,j} = P_{i,j}^{avg}$.

The sensors are turned on and left running for about 40 minutes. This is the 'startup period' used to initialize $\{P_{i,j}^{avg}\}$i,j and $\sigma_p$. Beginning at time 19:00:08, as detailed in Table 1, a person walks into the room, walks to and then stands in each corner, each for one minute, and finally leaves the room.

TABLE 1

| Motion Experiment Timeline | |
|---|---|
| 19:00:08-19:01:02 | Open door, walk to, then stand in, SW corner. |
| 19:01:03-19:02:02 | Walk to, then stand in, SE corner. |
| 19:02:03-19:03:08 | Walk to, then stand in, NE corner. |
| 19:03:09-19:04:03 | Walk to, then stand in, NW corner. |
| 19:04:04 | Exit room. |

TABLE 2

RTI Experiment Settings

| Variable Name | Description |
|---|---|
| *Experiment Description* | |
| N = 20 | Number of sensors |
| K = 190 | Number of links measured |
| M = 121 | Number of pixels |
| $P_{i,j}^{avg}$ | Average $P_{i,j}$ prior to 19:00:08 |
| $\sigma_p$ | Std. dev. of pixel values p prior to 19:00:08 |
| *Channel Model Parameters from [2]* | |
| δ = 0.21 m | Attenuation field correlation distance |
| $\frac{\sigma_X^2}{\sigma_{dB}^2} = 0.29$ | Shadowing variance ratio |
| *RTI Algorithm Parameters* | |
| λ = 0.2 m | Ellipse 'width' parameter |
| $d_{min}$ = 2 m | Minimum link length |
| $\sigma_K^2$ = 3 | Regularization constant |
| c = 2.8 | # of $\sigma_p$ for contrast threshold |
| b = 5 | Maximum contrast parameter |
| $\epsilon_a$ = 0.1 | Minimum contrast scale factor |

The image intensity vector $\hat{p}$ is calculated each second, using the constants listed in Table 2 and display images. In FIGS. 7(a-e), images recorded exactly one minute apart are shown.

The first four images are those at 19:00:23, 19:01:23, 19:02:23, and 19:03:23, within 20 seconds after the movement to the SE, SW, NW, and NE corners, respectively. The final image shown in FIG. 7(e) is taken at 19:04:23, about 20 seconds after the person left the room.

From FIG. 7, positive results are noted. The results show that the extra attenuation caused by a person in a room can be both detected and located. When no motion exists, images are almost always empty, with $\hat{p}\approx 0$. While a person is stationary in the room, there is noticeable change, and the darkest pixels indicate the general location of that extra attenuation. The images in FIGS. 7a-e clearly display images that indicate that motion exists with multiple dark pixels.

Note that the number of links will likely increase at the same rate as the number of pixels as the area size increases. If sensors are deployed with constant Δx spacing between them around the perimeter of a square area with side length L, both the number of pixels and the number of links increase as $\mathcal{O}(L^2)$. Thus constant resolution can be expected as RTI is applied to larger areas.

As such, quantitative effects of the real-world phenomenon of correlated shadowing on links are described, in connectivity, localization, and in radio tomographic imaging.

Figure 8A:
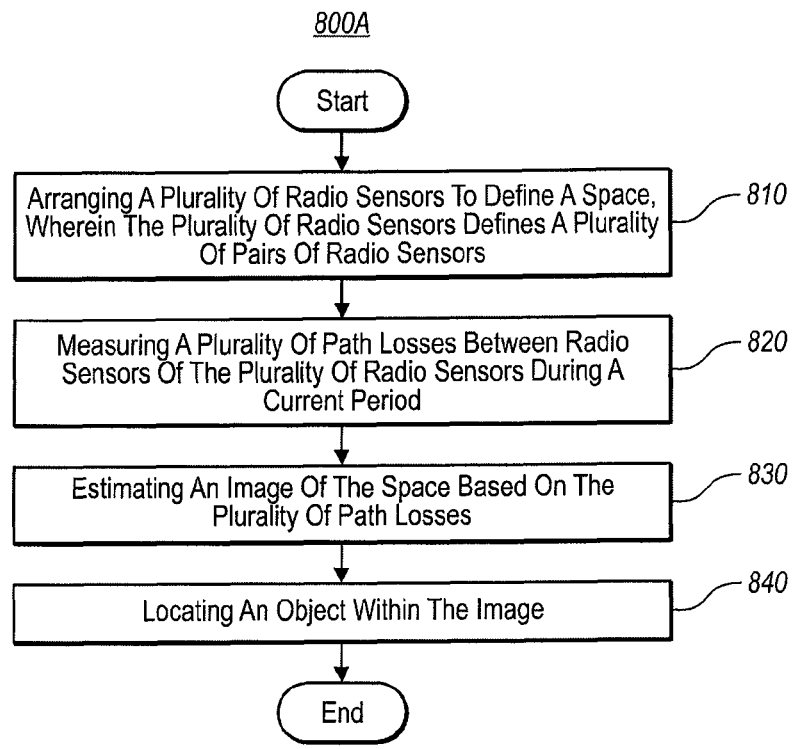
FIG. 8A is a flow chart illustrating a method for imaging a space, in accordance with one embodiment of the present invention.
Figure 8B:
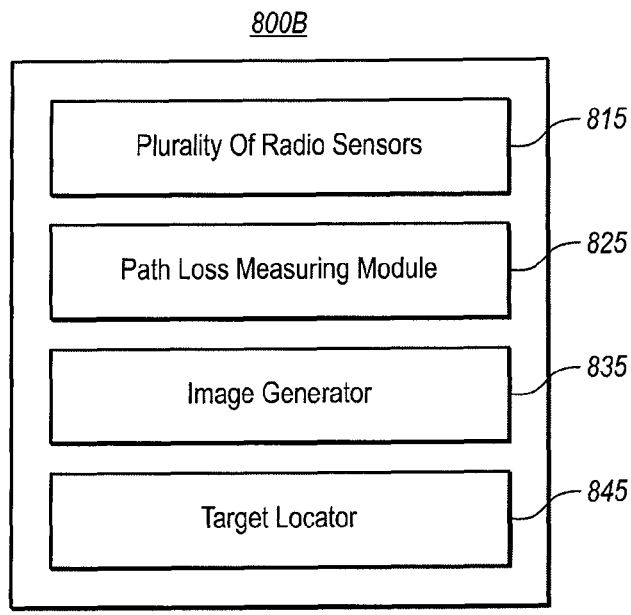
FIG. 8B is a system capable of implementing the method of FIG. 8A for imaging a space, in accordance with one embodiment of the present invention.

FIGS. 8A-B combined illustrate a system and method for imaging space. In particular, FIG. 8A is a flow chart 800A illustrating a method for imaging a space, in accordance with one embodiment of the present invention. FIG. 8B is a system 800B that is capable of implementing the method of FIG. 8A for imaging a space for purposes of locating an object within the space, in one embodiment. The method and system of FIGS. 8A-B incorporates the concepts described previously in relation to FIGS. 4-7.

Figure 5:
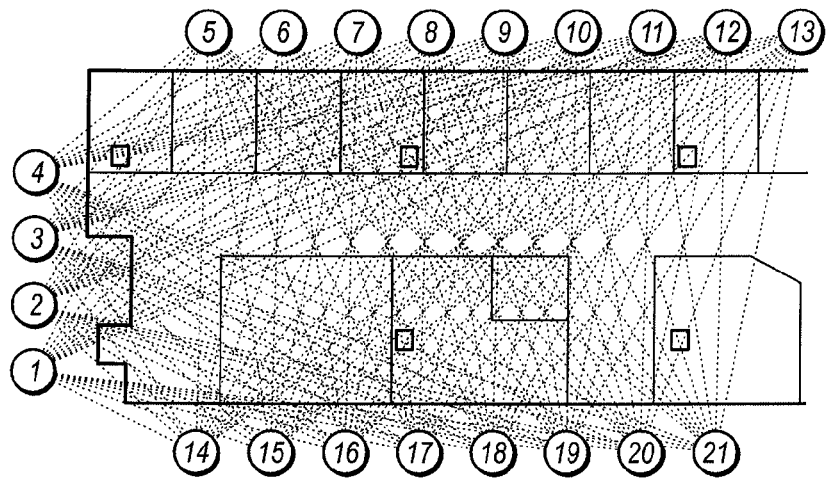
FIG. 5 is an illustration of nodes measuring shadowing on links covering a building area, where radio tomographic imaging image the area's transmission properties, in accordance with one embodiment of the present invention.

In the method outlined in FIG. 8A, at 810, a plurality of radio sensors is arranged around a space. The system 800B includes the plurality of radio sensors 815 that can be arranged around a space. The plurality of radio sensors defines a plurality of pairs of radio sensors, for purposes of radio tomographic imaging. For example, FIG. 5 illustrates a plurality of sensors 1-21 surrounding a floor of a building. A sensor is paired with each remaining sensor in the plurality of sensors to form the plurality of pairs of radio sensors.

The space that is defined could be two or three dimensional. For instance, the space could define a room or a floor in a building. As such, the plurality of sensors could be arranged in three dimensions around and within the space, in one embodiment. In that case, the plurality of sensors could define a space of three dimensions. In addition, the plurality of sensors could be arranged in two dimensions, in one embodiment. In that case, the plurality of sensors could be arranged around and within a space. The plurality of sensors could be approximately arranged on a plane to define the space of two dimensions. For example, in FIG. 5 the floor of the building is the defined space. The plurality of sensors 1-21 is arranged on an outer boundary of the space. The plurality of sensors 1-21 could be arranged on a two dimensional plane intersecting the floor, and in that case the space is defined as being of two dimensions. In another case, the plurality of sensors 1-21 could be arranged in three dimensions, and would define an interior volume of space.

In one embodiment, the plurality of radio sensors is arranged in a circular pattern that defines the space. In other embodiments, the plurality of radio sensors is arranged in any shaped pattern to define the space.

In still other embodiments, the plurality of radio sensors is arranged in a random pattern. Specifically, the random pattern is not circular. In addition, at least one radio sensor could be placed within the space that is defined. That is, one or more radio sensors could be within the space. For instance, a radio sensor could be placed on the floor of a room that is the space, or on a wall, or on a table.

At 820, a plurality of path losses is measured between radio sensors of the plurality of radio sensors in a current period. For instance, the path loss measuring module 825 is capable of measuring the plurality of path losses between radio sensors, as described in 820. In one embodiment, the plurality of path losses is determined by measuring path losses for each pair of radio sensors in the plurality of pairs of radio sensors in the current period. As an illustration, for each pair of radio sensors in FIG. 5, a path loss, as representing attenuation, is measured over the current period, in one embodiment. The path loss can be an overall path loss or attenuation that represents path losses sampled over the current period for a corresponding pair of radio sensors. Path loss can be determined based on the transmit power of the signal sent and the received power.

Figure 4A:
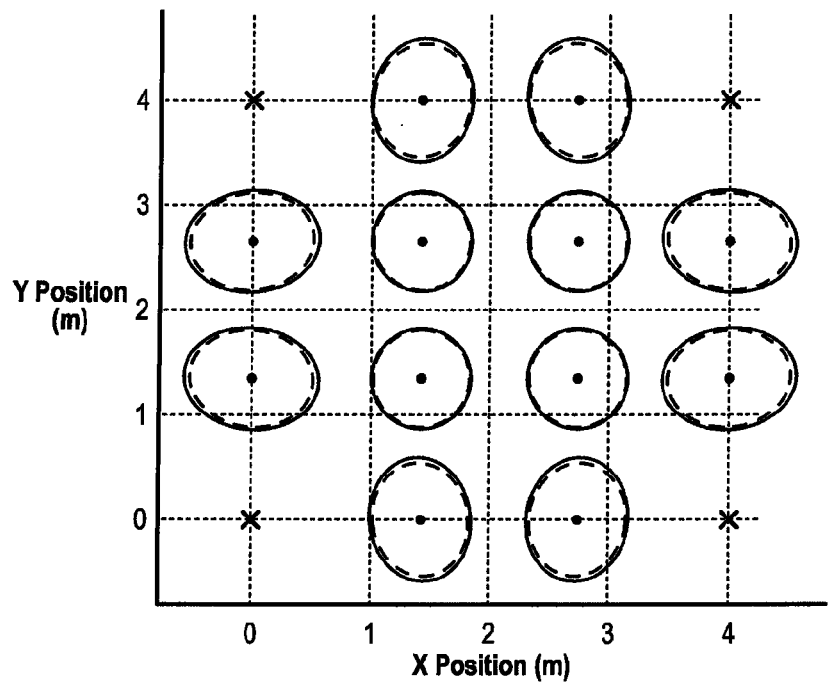
FIGS. 4(a) and 4(b) are illustrations that the NeSh model "mean term-only" bound and CRB using the i.i.d. link fading model on localization one σ uncertainty ellipses, for the same (a) grid and (b) random deployment in FIG. 3.
Figure 4B:
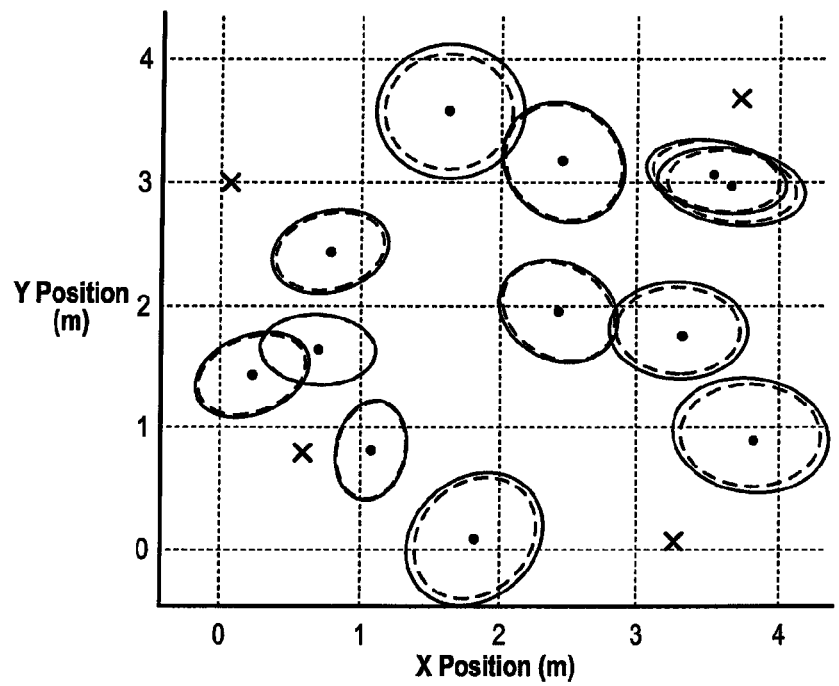

More specifically, in one embodiment for each pair of radio sensors, the attenuation of each pixel area in the space is determined, as previously described in FIGS. 4A-B. As such, attenuation for all pixel areas defined in the space is determined, for each pair of radio sensors. An accumulated attenuation for each pixel area can then be determined by summing all attenuation for a pixel area, as determined for each pair of radio sensors.

In another embodiment, a path loss is represented as a variance of path losses over a current period. That is, the path loss between a pair of sensors is determined by calculating a variance of path losses between samples measured during the current period.

At 830, an image of the space is estimated based on the plurality of path losses. For instance, image generator 835 in system 800B is capable of estimating the image based on the plurality of path losses. More specifically, as described previously, an inverse function is applied to the attenuation at each pixel space to estimate the image, in one embodiment. In another embodiment, the image generated represents a variance of path losses for each pixel area in the defined space.

To improve the estimation of the image, a baseline of path losses can be determined and compared to measurements obtained during the current period, in one embodiment. In particular, the estimation of the image is accomplished by comparing the plurality of path losses to the baseline of path losses to improve the quality of the image. That is, for each pixel area, a difference between the total attenuation measured and the baseline attenuation of path loss is determined. Then, the inverse function is applied to each difference for all the pixel areas to generate the image.

For instance, in one embodiment, the baseline of path losses can be determined by measuring path loss or a representative path loss between each of the plurality of pairs of radio sensors during a baseline period. In another embodiment, the baseline of path losses can be determined by estimating the path loss or a representative path loss between each pair of the plurality of radio sensors based on what is known about their positions and the environment in which they are placed.

In addition, the image quality can be improved by filtering out a middle range of attenuation values, in another embodiment. In this manner, the contrast of the image is increased. Specifically, strong attenuation values are used in generating the image.

At 840, an object is located within the image. For instance, the system 800B includes a target locator 845 that is capable of locating the object. That is, the object is identified as an object of interest within the image. For instance, the object would exhibit higher attenuation for corresponding pixels in the image. More particularly, the corresponding pixels would exhibit higher attenuation within the image than in a baseline image, and indicates that the object is newly present in the defined space.

Thereafter, the location of the object is determined. Determination of the location is achieved first by performing a localization procedure between the plurality of radio sensors in the space. For instance, in one embodiment, the localization process is a self-localization process. In that manner, coordinate dimensions (e.g., GPS coordinates) can be assigned to each pixel area in the space. Those objects occupying a particular pixel area can then be given a location.

In another embodiment, the object is further identified through the use of active tags, such as radio-frequency identification (RFID) tags. For instance, in parallel to object identification and localization described above, a process for identifying the object is implemented.

In particular, the process is capable of determining if the object is emitting a signal from an active tag. If the object is not emitting a signal (e.g., not associated with an active tag), or is emitting an improper signal (e.g., emitting a signal based on an unauthorized format or protocol), then it is determined that the object is not authorized in the defined space, when only objects associated with authorized active tags are given access to the defined space. In that case, notification or an alert is provided that indicates the object is unidentifiable and is practicing unauthorized access of the defined space.

On the other hand, the process is also capable of determining that the object is emitting a signal from an authorized active tag. Based on the signal, tables are cross-referenced to determine an identification of the object. Thereafter, it can be determined if that identified object has authorization to access the defined space. If the object does not have authorization, notification can be provided of the violation of the controlled space by the identified object.

Figure 9A:
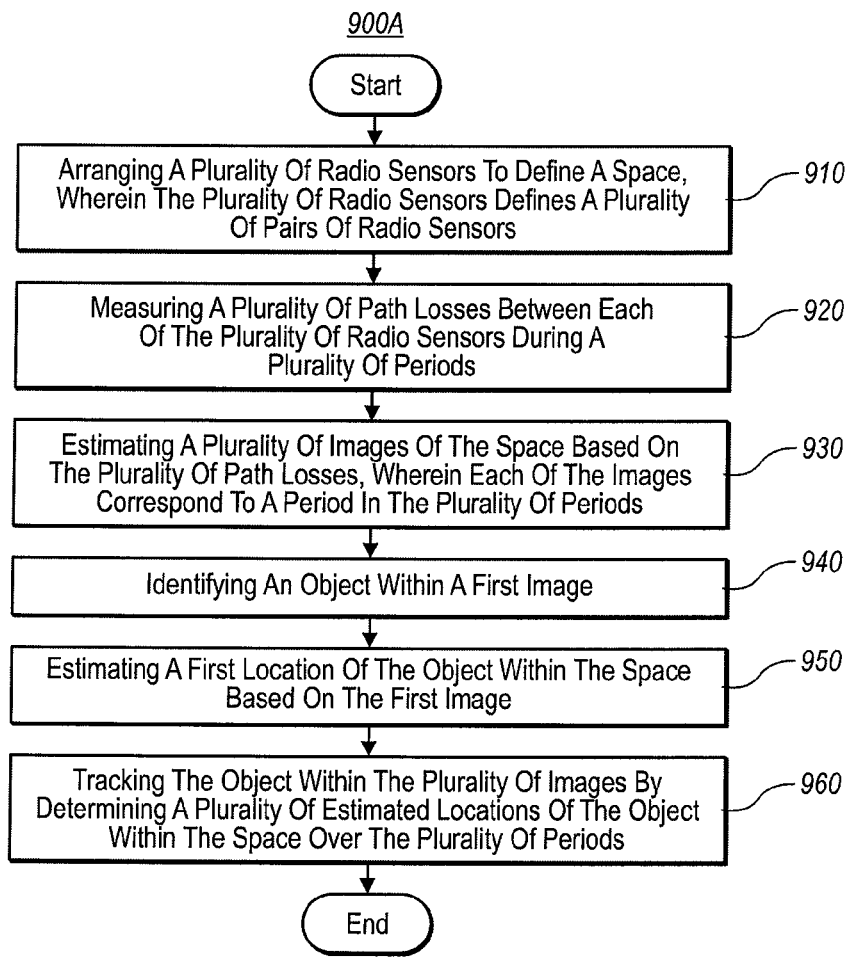
FIG. 9A is a flow chart illustrating a method for tracking an object, in accordance with one embodiment of the present invention.
Figure 9B:
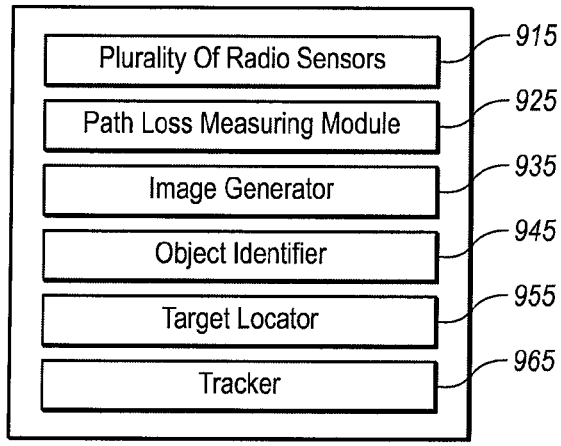
FIG. 9B is a system capable of implementing the method of FIG. 9A for tracking an object within a space, in accordance with one embodiment of the present invention.

FIGS. 9A-B combined illustrate a method and system for tracking an object. In particular, FIG. 9A is a flow chart 900A illustrating a method for tracking an object within a space using radio tomography, in accordance with one embodiment of the present invention. Also, FIG. 9B is a system 900B that is capable of implementing the method illustrated in FIG. 9A, in accordance with one embodiment of the present invention. The method and system of FIGS. 9A-B incorporate the concepts described previously in relation to FIGS. 4-7.

In the method illustrated in FIG. 9A, at 910, a plurality of radio sensors is arranged around a space. For instance, system 900B includes a plurality of radio sensors configurable for arrangement around the space. The plurality of radio sensors defines a plurality of pairs of radio sensors, for purposes of radio tomographic imaging. The operation of 910 is analogous to 810 of FIG. 8, and can define a space of two or three dimensions, as previously described.

At 920, a plurality of path losses is measured between each of the plurality of radio sensors during a plurality of periods. For instance, system 900B includes a path loss measuring module 925 for measuring a plurality of path losses between sensors in the plurality of radio sensors, and more particularly for measuring path losses between each pair of radio sensors in the plurality of pairs of radio sensors over the plurality of periods. The operation of 920 for measuring path loss over one period is analogous to 820, and the description relative to 820 is applicable to 920 for measuring path loss over a period. As such, path loss, such as attenuation, variance, motion, etc., is determined for each pixel area in the space. In addition, a total attenuation can be determined for each pixel area in the space, given the attenuation at each pixel area for each pair of radio sensors.

At 930, a plurality of images of the space is estimated based on the plurality of path losses. In particular, each image that is estimated corresponds to a period in the plurality of periods. For instance, system 900B includes an image generator 935 for estimating the plurality of images for the space based on the plurality of path losses. As such, instead of estimating one image over a current period, a plurality of images is estimated over a plurality of periods, for purpose of tracking.

The estimation of a single image is described in relation to 830 of FIG. 8A. In particular, the estimation of the image is based on some function applied to the plurality of path losses. For instance, an inverse function is applied to the attenuation at each pixel space to estimate the image, in one embodiment. In another embodiment, the image generated represents a variance of path losses for each pixel area in the defined space. In still another embodiment, the image generated represents motion through a pixel area in the defined space.

Moreover, the estimation of the image can be improved by comparing the plurality of path losses to a baseline of path losses, as previously described. As such, a baseline of path losses is determined and compared to measurements obtained during a period used to generate a corresponding image. More particularly, for each pixel area in a defined space, a difference between the total attenuation measured over a current period and the baseline attenuation of path loss is determined. Then, the inverse function is applied to each difference for all the pixel areas to generate the image.

At 940, an object is identified within a first image. For instance, system 900B includes an object identifier 945 that is capable of identifying an object within the image. More particularly, the object identifier 945 is capable of determining that an object of interest has appeared within the image. For instance, the object exhibits higher attenuation for corresponding pixel areas within the image, especially when compared to attenuation for the same pixel areas taken during baseline measurements.

At 950, the location of the object is estimated within the space, as previously described in 840 of FIG. 8. For instance, target locator 955 of system 900B is capable of estimating a first location of the object within the defined space, based on the first image. As described previously, location within the space is achieved by performing a localization procedure between the plurality of radio sensors. As such, pixel areas can be assigned to particular points within the defined space, such as assigning coordinate dimensions to the defined space. An object occupying one or more pixel areas can then be given a location.

At 960, the object is tracked within the plurality of images. For instance, tracker 965 of system 900B is capable of tracking the object through the plurality of images by determining a plurality of estimated locations for the object within the space based on the plurality of images taken during the plurality of periods. Tracking is accomplished by filtering the images to determine the locations of the object within each image in the plurality of images, in one embodiment. As an illustration, the object is identified in each of the images. A determination can be made to verify that each of the objects in the plurality of images is the same object, but is moving through the space over time. Movement can be tracked by determining the locations of the object within the space over time based on the plurality of images.

In one case, the filtering process filters out noise to bring out the object. As such, the locations of the object can be estimated in the plurality of images for purposes of tracking. In addition, the tracking can include a further future estimation process for determining where an object should be located. The estimated locations can be used to throw out erroneous readings of locations of the object within the image. The erroneous readings can be substituted with the estimated locations, or completely thrown out, in embodiments of the invention.

Figure 10A:
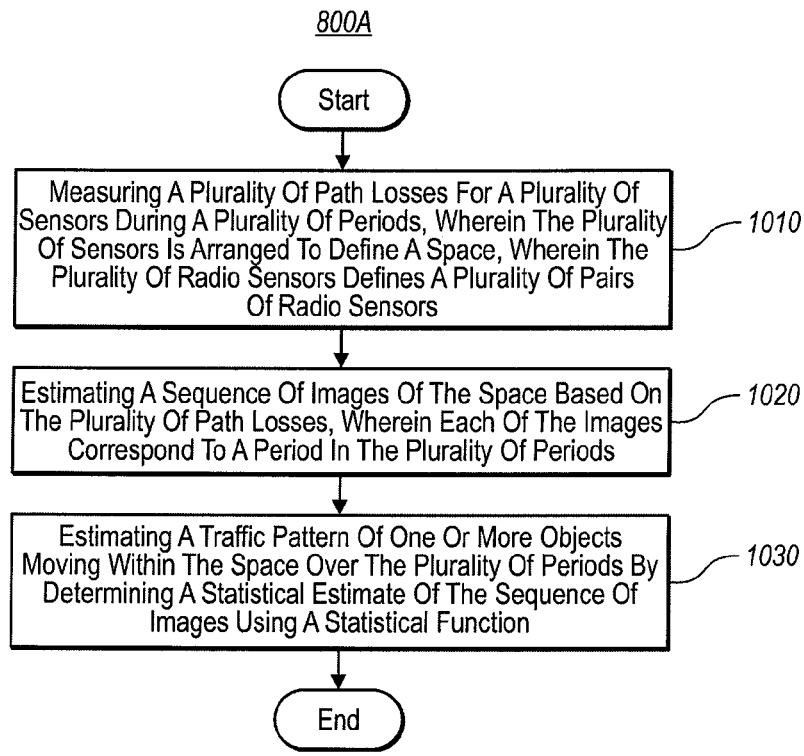
FIG. 10A is a flow chart illustrating a method for measuring traffic patterns, in accordance with one embodiment of the present invention.
Figure 10B:
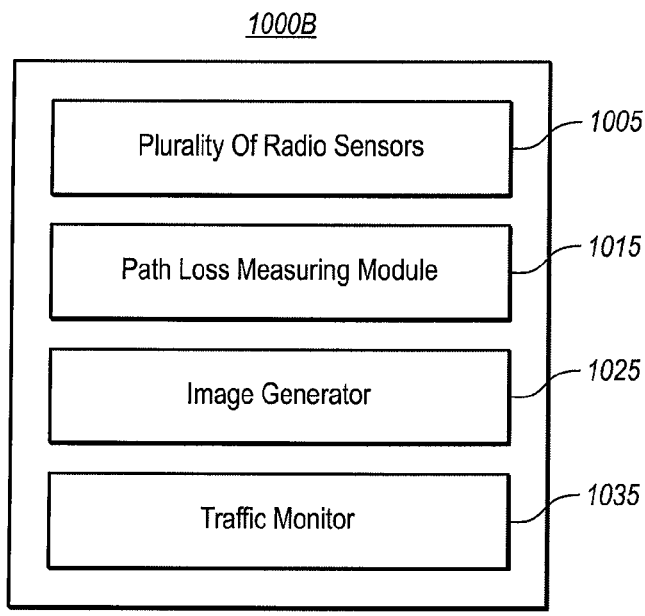
FIG. 10B is a system capable of implementing the method of FIG. 10A for measuring traffic patterns, in accordance with one embodiment of the present invention.

FIGS. 10A-B combined illustrate a method and system for performing traffic measurements. In particular, FIG. 10A is a flow chart 1000A illustrating a method for imaging using radio tomography, in accordance with one embodiment of the present invention. Also, FIG. 10B is a system 1000B that is capable of implementing the method illustrated in FIG. 10A for purposes of measuring traffic patterns, in accordance with one embodiment of the present invention. The method and system of FIGS. 10A-B incorporate the concepts described previously in relation to FIGS. 4-9.

In the method illustrated in FIG. 10A, at 1010, a plurality of path losses is measured between a plurality of sensors during a plurality of periods, in accordance with one embodiment of the present invention. For instance, a path loss measuring module 1015 is capable of measuring a plurality of path losses between sensors in a plurality of sensors.

More particularly, the plurality of sensors is arranged around a space. For instance, system 1000A includes a plurality of radio sensors 1005 that can be configurable to be arranged around a space, as previously defined. The plurality of sensors correspondingly define a plurality of pairs of radio sensors, for purposes of radio tomographic imaging. The space can be defined as being two or three dimensions.

The operation for measuring path losses over the plurality of periods is analogous to the 820 and 920, and descriptions relative to 820 and 920 are applicable to 1010 for measuring path losses over the plurality of periods.

At 1020, a sequence of images is estimated based on the plurality of path losses. In particular, each image that is estimated in the sequence corresponds to a period in the plurality of periods. For instance, system 1000B includes an image generator 1025 for estimating the sequence of images for the space based on the plurality of path losses. As such, instead of estimating one image over a period, a sequence of images is estimated over a plurality of periods, for purposes of traffic monitoring.

The estimation of a single image is described previously in relation to 830 of FIG. 8A. In particular, the estimation of the image is based on some function applied to the plurality of path losses. For instance, an inverse function is applied to the attenuation at each pixel space to estimate the image, in one embodiment. In another embodiment, the image generated represents a variance of path losses for each pixel area in the defined space. In still another embodiment, the image generated represents motion through a pixel area in the defined space.

At 1030, a traffic pattern is estimated for one or more objects moving within the space over the plurality of periods. For instance, system 1000B includes a traffic monitor 1035 for estimating a traffic pattern of objects moving within the space over the plurality of periods.

More particularly, the traffic pattern is estimated by determining a statistical estimate of the sequence of images using a statistical function. For example, the statistical estimate combines the sequence of images into a single, overall image that illustrates a traffic pattern of objects. In the overall image, higher traffic areas are highlighted over areas that do not receive much traffic. For instance, higher traffic areas may be associated with higher attenuation, or higher path losses for corresponding pixel areas.

In one embodiment, the statistical estimate is determined by performing one of a plurality of accumulation functions over the sequence of images. For instance, in one embodiment, the sequence of images are summed to generate a single image that illustrates a traffic pattern of objects in the space. As another accumulation function, the sequence of images is averaged (e.g., determining mean values for pixel areas) to generate a single image, or other representation, that illustrates a traffic pattern of objects in the space.

In another embodiment, the statistical estimate is determined by performing a variance function over the sequence of images to determine variation between measurements in pixels areas of the images from a sample mean. For instance, in the sequence of images, a variance of measurements as represented for each pixel in the images is determined to generate the overall image to illustrate a traffic pattern of objects. In still another embodiment, the statistical estimate is determined by performing a median function over the sequence of images. Still other embodiments envision implementing other statistical functions to determine the statistical estimate.

A method and system for object identification and tracking is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

The invention claimed is:

1. A method for locating an object within a space using radio tomography, the method comprising:

arranging a plurality of radio sensors about said space;

transmitting a first radio signal at a first transmit signal strength;

receiving said first radio signal at a first radio sensor of said plurality of radio sensors at a first received signal strength;

measuring said first received signal strength of said radio signal at said first sensor during a current period;

calculating a first path loss by comparing said first transmit signal strength and said first received signal strength;

receiving said first radio signal at a second radio sensor of said plurality of radio sensors;

measuring a second received signal strength of said first radio signal at said second sensor during a current period;

calculating a second path loss by comparing said first transmit signal strength and said second received signal strength;

transmitting a second radio signal at second transmit signal strength;

receiving said second radio signal at a third radio sensor of said plurality of radio sensors;

measuring a third received signal strength of said second radio signal at said third sensor during a current period;

calculating a third path loss by comparing said second transmit signal strength and said third received signal strength; and estimating a spatial image of said space based on at least partially said first path loss, said second path loss, and said third path loss; and providing information reflective of said spatial image for perception by a user.

2. The method of claim 1, the method further comprising:

transmitting a third radio signal at a third transmit signal strength;

receiving said third radio signal at said first radio sensor of said plurality of radio sensors at a fourth received signal strength;

measuring said fourth received signal strength of said third radio signal at said first sensor during a baseline period;

calculating a fourth path loss by comparing said third transmit signal strength and said fourth received signal strength;

receiving said third radio signal at said second radio sensor of said plurality of radio sensors;

measuring a fifth received signal strength of said third radio signal at said second sensor during said baseline period;

calculating a fifth path loss by comparing said third transmit signal strength and said fifth received signal strength;

transmitting a fourth radio signal at a fourth transmit signal strength;

receiving said fourth radio signal at said third radio sensor of said plurality of radio sensors;

measuring a sixth received signal strength of said fourth radio signal at said third sensor during said baseline period;

calculating a sixth path loss by comparing said fourth transmit signal strength and said third received signal strength; and estimating a baseline spatial image of said space based on at least partially said fourth path loss, said fifth path loss, and said sixth path loss;

comparing said spatial image of said space with said baseline spatial image of said space;

providing information reflective of said comparison for perception by a user.

3. The method of claim 2, the method further comprising:

comparing said first path loss with said fourth path loss using an inverse function;

comparing said second path loss with said fifth path loss using said inverse function; and comparing said third path loss with said sixth path loss using said inverse function.

4. The method of claim 2, the method further comprising:

locating an object by comparing said spatial image with said baseline spatial image; and providing information reflective of said object location for perception by a user.

5. The method of claim 1, wherein said space has a plurality of pixel areas and wherein said estimating a spatial image further comprises:

determining an attenuation for each pixel area of said plurality of pixel areas in said space based on at least one of said first path loss, said second path loss, said third path loss, said fourth path loss, said fifth path loss, and said sixth path loss.

6. The method of claim 5 wherein said estimating a spatial image further comprises:

for each pixel area of said plurality of pixel areas in said space, determining a plurality of attenuations based on said first path loss, said second path loss, said third path loss, said fourth path loss, said fifth path loss, and said sixth path loss; and calculating a total attenuation for each pixel area of said plurality of pixel areas based at least partially on totaling each attenuation from among said plurality of attenuations for each pixel area.

7. The method of claim 6, wherein said attenuation for each pixel area of said plurality of pixel areas includes a middle range attenuation and wherein said estimating a spatial image further comprises:

filtering out said middle range attenuation to increase contrast of said spatial image.

8. The method of claim 1, wherein said calculating a first path loss includes determining a first path loss variance over said current period, said calculating a second path loss includes determining a second path loss variance over said current period, and said calculating a third path loss includes determining a third path loss variance over said current period, and wherein said estimating an image is based at least partially on said first path loss variance, said second path loss variance, and said third path loss variance.

9. The method of claim 1, wherein said arranging a plurality of radio sensors further comprises:

placing at least one radio sensor within a boundary of said space that is defined.

10. The method of claim 1, wherein said space includes a room in a building.

11. The method of claim 1, further comprising:

providing an object with an active tag, said active tag emitting a tag signal;

detecting said active tag is emitting said tag signal; and identifying said object based on said tag signal.

12. The method of claim 11, further comprising:

determining said object is not authorized access to said space based on said identification of said object; and providing notification that said object does not have authorization to access said space.

13. A system for imaging using radio tomography, the system comprising:
   a plurality of radio sensors arranged to define a space;
   a path loss measuring module configured to measure a plurality of path losses between radio sensors during a current period;
   an image generator configured to estimate an image of said space based on said plurality of path losses; and
   a target locator configured to locate an object within said image.

14. The system of claim 13, the system further comprising:
   a baseline calculating module configured to determine a baseline of path losses for said plurality of radio sensors by measuring path losses between each radio sensor of said plurality of radio sensors during a baseline period; and
   wherein said image generator is configured to estimate said image by comparing said plurality of path losses with said baseline of path losses.

15. The system of claim 13, wherein said space is represented by a plurality of pixel areas and wherein said image generator determines an attenuation for each pixel area of said plurality of pixel areas for each radio sensor of said plurality of radio sensors.

16. A system for object tracking using radio tomography, the system comprising:
   a plurality of radio sensors arranged to define a space;
   a path loss measuring module configured to measure a plurality of path losses at each radio sensor from among said plurality of radio sensors during a plurality of periods;
   an image generator configured to estimate a plurality of images of said space based on said plurality of path losses at each radio sensor from among said plurality of radio sensors, each of said images corresponding to a period in said plurality of periods;
   an object identifier configured to identify an object within a first image;
   a locator configured to estimate a first location of said object within said space based on said first image; and
   a tracker configured to track said object within said plurality of images by determining a plurality of estimated locations of said object within said space over said plurality of periods.

* * * * *

UNITED STATES PATENT AND TRADEMARK OFFICE
CERTIFICATE OF CORRECTION

PATENT NO. : 8,502,728 B2
APPLICATION NO. : 13/063646
DATED : August 6, 2013
INVENTOR(S) : Patwari et al.

It is certified that error appears in the above-identified patent and that said Letters Patent is hereby corrected as shown below:

On the Title Page
Item (75), Inventors, change "Sarang Joshi, Salt Lake City, UT (US); Anthony Joseph Wilson, Salt Lake City, UT (US; Neal Patwari, Salt Lake City, UT (US)" to --Dr. Neal K. Patwari, Salt Lake City, UT (US); Dr. Anthony Joseph Wilson, Salt Lake City, UT (US); Dr. Sarang C. Joshi, Salt Lake City, UT (US)--
Item (56), U.S. Patent Documents, change "Steinway et al. ......342/22" to --Steinway et al. ......342/022--
Item (56), U.S. Patent Documents, change "Steinway et al. ......342/27" to --Steinway et al. ......342/027--
Item (56), Other Publications, change "Zang Li, Wenyuan Xu, Rob miller" to --Zang Li, Wenyuan Xu, Rob Miller--

In the Drawings
Sheet 9, replace Figure 10A with the figure depicted below, wherein reference number 800A is replaced with 1000A Signed and Sealed this
Thirtieth Day of September, 2014

Michelle K. Lee
*Deputy Director of the United States Patent and Trademark Office*

CERTIFICATE OF CORRECTION (continued)
U.S. Pat. No. 8,502,728 B2

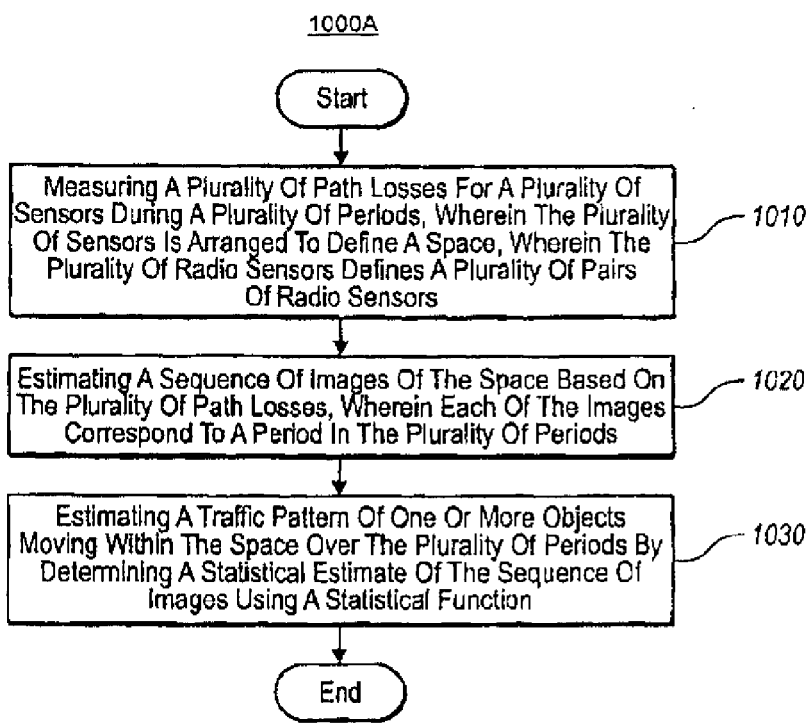

FIG. 10A

In the Specification

Column 2
Line 1, change "one or uncertainty ellipses" to --one σ uncertainty ellipses--
Line 8, change ""mean term-only" bound" to --is "mean term-only" bound--
Line 8, change "CRB using" to --CRB uses--
Line 18, change "for times of a person in a room" to --for times when a person is in a room--

Column 3
Line 11-12, change "Large-scale path loss due to distance; shadowing" to --(1) large-scale path loss due to distance; (2) shadowing--
Line 21, change "is the is the ensemble" to --is the ensemble--

Column 4
Line 34, change "to exhibits" to --to exhibit--

Column 5
Line 30, change "is a is multivariate" to --is a multivariate--
Line 36, change "P, results" to --P results--
Line 62, change "receiver j, and otherwise" to --receiver j, otherwise--

Column 6
Line 18, change "Eqn., 12" to --Eqn. 12--
Line 28, change "network of N=16 nodes deployed" to --network of N=1 nodes is deployed--

CERTIFICATE OF CORRECTION (continued)
U.S. Pat. No. 8,502,728 B2

Column 9
Line 6, change "unexpected, because" to --unexpected because--
Line 18, change "$F_C$, and focus" to --$F_C$, focus--

Column 12
Line 6, change "described in below" to --described below--

Column 15
Line 35, change "indicates that" to --indicate that--

UNITED STATES PATENT AND TRADEMARK OFFICE
CERTIFICATE OF CORRECTION

PATENT NO.        : 8,502,728 B2
APPLICATION NO.   : 13/063646
DATED             : August 6, 2013
INVENTOR(S)       : Sarang Joshi et al.

Page 1 of 1

It is certified that error appears in the above-identified patent and that said Letters Patent is hereby corrected as shown below:

Title Page,
Item [75], Inventors, "Dr. Neal K. Patwari, Salt Lake City, UT (US); Dr. Anthony Joseph Wilson, Salt Lake City, UT (US); Dr. Sarang C. Joshi, Salt Lake City, UT (US)" (as corrected to read in the Certificate of Correction issued September 30, 2014) is deleted and patent is returned to its original state with the order of the inventors names in patent to read -- Sarang Joshi, Salt Lake City, UT (US); Anthony Joseph Wilson, Salt Lake City, UT (US); Neal Patwari, Salt Lake City, UT (US); --.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,502,728 B2
APPLICATION NO.   : 13/063646
DATED             : August 6, 2013
INVENTOR(S)       : Patwari et al.

It is certified that error appears in the above-identified patent and that said Letters Patent is hereby corrected as shown below:

Title Page,

Item (75), Inventors, change "Sarang Joshi, Salt Lake City, UT (US); Anthony Joseph Wilson, Salt Lake City, UT (US; Neal Patwari, Salt Lake City, UT (US)" to -- Dr. Neal K. Patwari, Salt Lake City, UT (US); Dr. Anthony Joseph Wilson, Salt Lake City, UT (US); Dr. Sarang C. Joshi, Salt Lake City, UT (US) --

Signed and Sealed this
Twenty-seventh Day of October, 2015

Michelle K. Lee
*Director of the United States Patent and Trademark Office*

UNITED STATES PATENT AND TRADEMARK OFFICE
CERTIFICATE OF CORRECTION

PATENT NO.       : 8,502,728 B2                                     Page 1 of 3
APPLICATION NO.  : 13/063646
DATED            : August 6, 2013
INVENTOR(S)      : Patwari et al.

It is certified that error appears in the above-identified patent and that said Letters Patent is hereby corrected as shown below:

<u>On the Title Page</u>
Item (12) "Joshi" should read --Patwari, et al.--
Item (75) Inventor is corrected to read:
--Neal Patwari, Salt Lake City (UT);
  Anthony Joseph Wilson, Salt Lake City (UT);
  Sarang Joshi, Salt Lake City (UT)--
Item (56), U.S. Patent Documents, change "Steinway et al. ......342/22" to --Steinway et
       al. ......342/022--
Item (56), U.S. Patent Documents, change "Steinway et al. ......342/27" to --Steinway et
       al. ......342/027--
Item (56), Other Publications, change "Zang Li, Wenyuan Xu, Rob miller" to --Zang Li, Wenyuan
       Xu, Rob Miller--

This certificate supersedes the Certificate of Correction issued September 30, 2014.

Signed and Sealed this
Second Day of February, 2016

Michelle K. Lee
*Director of the United States Patent and Trademark Office*

CERTIFICATE OF CORRECTION (continued)
U.S. Pat. No. 8,502,728 B2

In the Drawings
Sheet 9, replace Figure 10A with the figure depicted below, wherein reference number 800A is replaced with 1000A

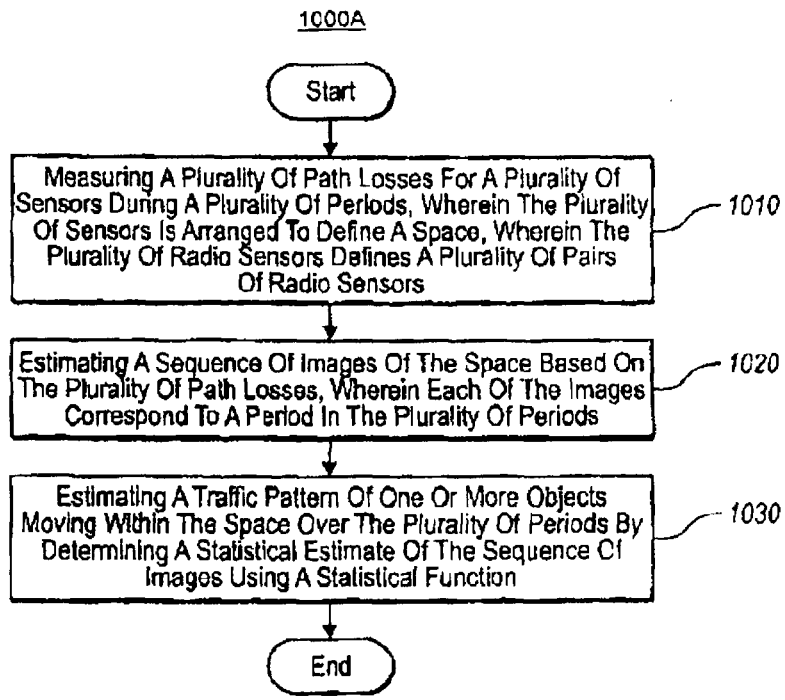

FIG. 10A

In the Specification

Column 2
Line 1, change "one or uncertainty ellipses" to --one σ uncertainty ellipses--
Line 8, change ""mean term-only" bound" to --is "mean term-only" bound--
Line 8, change "CRB using" to --CRB uses--
Line 18, change "for times of a person in a room" to --for times when a person is in a room--

Column 3
Line 11-12, change "Large-scale path loss due to distance; shadowing" to --(1) large-scale path loss due to distance; (2) shadowing--
Line 21, change "is the is the ensemble" to --is the ensemble--

Column 4
Line 34, change "to exhibits" to --to exhibit--

Column 5
Line 30, change "is a is multivariate" to --is a multivariate--
Line 36, change "P, results" to --P results--
Line 62, change "receiver j, and otherwise" to --receiver j, otherwise--

CERTIFICATE OF CORRECTION (continued)
U.S. Pat. No. 8,502,728 B2

Column 6
Line 18, change "Eqn., 12" to --Eqn. 12--
Line 28, change "network of N=16 nodes deployed" to --network of N=1 nodes is deployed--

Column 9
Line 6, change "unexpected, because" to --unexpected because--
Line 18, change "$F_C$, and focus" to --$F_C$, focus--

Column 12
Line 6, change "described in below" to --described below--

Column 15
Line 35, change "indicates that" to --indicate that--